March 19, 1963  J. R. OHMIT  3,082,290
MOVABLE FLOOR-TO-CEILING ELECTRICAL INSTALLATION
FOR INTERIOR OF A BUILDING
Filed July 29, 1959  2 Sheets-Sheet 1

INVENTOR.
JACK R. OHMIT
BY
Gene W. Arant
ATTORNEY.

March 19, 1963 J. R. OHMIT 3,082,290
MOVABLE FLOOR-TO-CEILING ELECTRICAL INSTALLATION
FOR INTERIOR OF A BUILDING
Filed July 29, 1959 2 Sheets-Sheet 2

INVENTOR.
JACK R. OHMIT
BY
Gene W. Arant
ATTORNEY.

United States Patent Office 3,082,290
Patented Mar. 19, 1963

3,082,290
MOVABLE FLOOR-TO-CEILING ELECTRICAL INSTALLATION FOR INTERIOR OF A BUILDING
Jack R. Ohmit, 4010 Vista Court, La Crescenta, Calif.
Filed July 29, 1959, Ser. No. 830,436
2 Claims. (Cl. 174—49)

The present invention relates to a movable electrical installation for the interior of a building, adapted to bring one or more electrical circuits from above the ceiling directly into a central portion of a room within the building.

Methods of installing electrical wiring in the interior of buildings have heretofore been narrowly restricted. Electrical circuits used for lighting or power purposes have, because of the danger of fire or of injury to human beings which is incident upon the relatively high energy levels involved, been subjected to numerous restrictions under applicable building and safety codes While telephone circuits do not present any equivalent safety problem it has been necessary to protect the wiring from damage which would interrupt the circuit operation, and also to protect the telephone wiring from inadvertent contact with the more highly energized power circuits. For both types of wiring the universal practice has been to provide as much physical protection for the wires as possible, and also to keep the wiring installations hidden from view wherever possible.

Thus the concept has been firmly established that interior wiring, whether for power circuits or telephone circuits or both, is a part of the building itself, and must be firmly imbedded or otherwise hidden within the floors, walls or ceilings of the permanent structure.

The concepts and practices of the prior art have resulted in a particularly acuate problem in large office buildings. In such buildings it has become frequently necessary to change the room designations from time to time by moving the actual or imaginary partitions which establish them, and frequent moving of furniture within a room is also commonplace. At the same time the number and types of both telephone and electrical appliances have increased tremendously. It is often necessary to place a telephone instrument on each desk in a room, and each instrument may have associated with it a recorder, an automatic answering device, a loud speaker, or other similar appliances. Modern offices not only require extensive lighting fixtures, but also electrically operated equipment such as electric typewriters, desk calculators, dictating and transcribing equipment, and other types of electrical apparatus too numerous to mention It is therefore commonplace for an office desk to require half a dozen or more telephone and electrical circuits to supply its operating requirements.

In rearranging the room dividers in large office buildings, or in making extensive rearrangement in the furniture location, the economic cost of relocating telephone circuits and electrical power circuits has therefore risen to disastrous proportions. For example, it is often the practice to install expensive new raceways imbedded in the concrete floor, while leaving the originally installed raceways unused, and thus wasted. But this is only a small fraction of the problem. High salaried engineers and executives are forced to spend days conversing in the corridors while their offices undergo the tortuous process of relocation of the electric wiring. The direct cost of relocating the electrical circuits, excessive in and of itself is far overshadowed by the lost salaries and wages, not to mention the most undesirable effect which is produced upon the time schedule of major projects which may be afoot.

The foregoing problems have been successfully solved by the present invention. A basic concept of the present invention is that the use of floors and walls as a point of entry for electrical circuits into a room must be given up in favor of the ceiling. The invention is particularly applicable to modern office buildings which utilize a suspended ceiling, which is typically of light weight and suspended two or three feet below the solid structure of the next higher floor level. The suspended ceiling is often utilized for the direct mounting of fluorescent lighting fixtures, and the space above it is also often used for the installation of air conditioning units. According to the present invention the suspended ceiling is also used as the point of entry for electrical power and telephone circuits into the room space beneath it.

According to the invention a rigid electrical conduit is vertically disposed within the room, with its upper end projecting through an opening in the ceiling for receiving an electrical power cable or telephone cable, or both. Electrical outlet means are associated with the bottom part of the electrical conduit to provide connections for utilization circuits. A rigid base member, removably fastened to the floor of the building, is rigidly coupled to the bottom end of the electrical conduit for supporting same in a fixed vertical position. On the upward surface of the ceiling suitable fastening means are provided for inhibiting horizontal motion of the upper end of the rigid conduit, and a suitable cable receptor or adapter is also provided which is coupled to the upper end of the conduit.

Above the ceiling the electrical cable is preferably installed so as to be easily movable, for example, by encasing it within the conventional type of flexible metallic conduit. Thus when the electrical installation of the present invention is to be moved to a different location in the room it is generally unnecessary to change the permanent cable connections above the ceiling. The base member from which the invention is supported is removed from the floor and reinstalled at a different floor location. The unit is partially disassembled for the purpose of removal from the ceiling opening, and a new ceiling opening is formed at the desired new location. Since the undersurface of the suspended ceiling is usually faced with small separate squares of facing material, such as Celotex, it is only necessary to remove and replace the particular square in which the previously used ceiling opening had been formed.

At a first glance it may seem that the electrical installation provided by the present invention would be unusable because of safety problems. A single pipe or electrical conduit standing vertical in the middle of a room would seem to be an ideal target for misguided or unobserving pedestrians, with the resultant possibility of complete destruction of the installation. However, the present invention is intended to be used primarily, if not exclusively, in close company with office desks and other items of furniture, which constitute the customers for its services and which simultaneously provide protection for it against unwanted physical damage.

One object of the invention, therefore, is to provide an electrical installation for serving various utilization circuits at a central room location within a building, and which may be quickly and economically moved to another location within the room space.

Another object of the invention is to provide an electrical installation for the interior of a building, for bringing electrical circuits from above the ceiling directly to the location of office desks or other furniture or equipment.

Yet another object of the invention is to provide an electrical installation for the interior of a building, for bringing both electrical power and telephone circuits directly to a center-of-room location.

The foregoing and other objects and advantages of the invention will be more readily apparent from the following description considered in conjunction with the accompanying drawings, in which.

Figure 1:
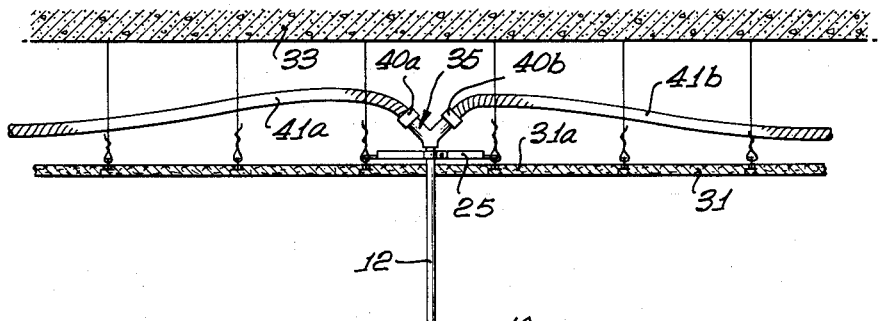
FIGURE 1 is an elevational view of a preferred form of my invention installed in the interior of a building.
Figure 2:
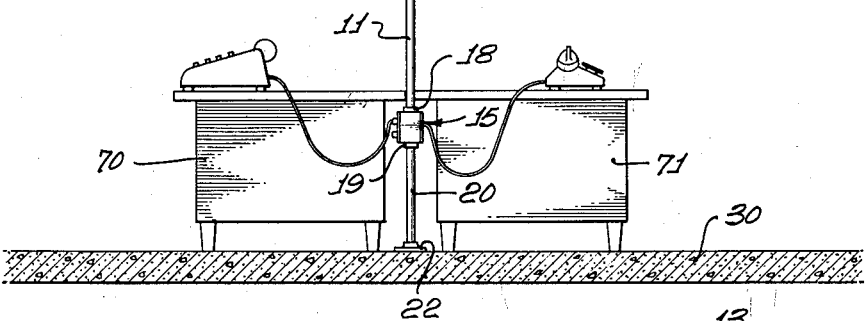
FIGURE 2 is a cross sectional view of the electrical conduit of FIGURE 1.
Figure 3:
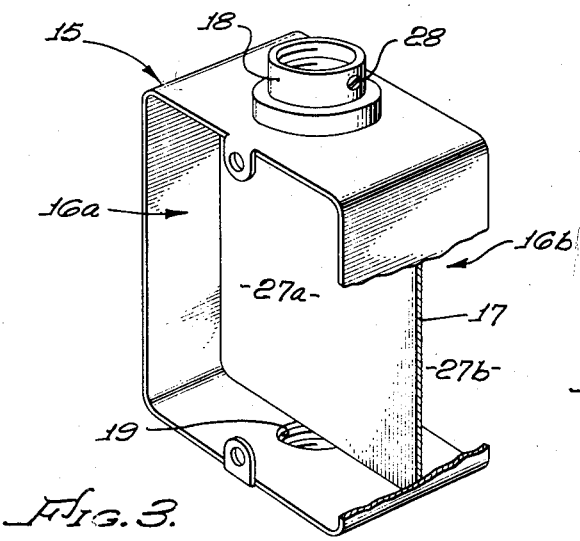
FIGURE 3 is a perspective view of the outlet box of FIGURE 1.
Figure 7B:
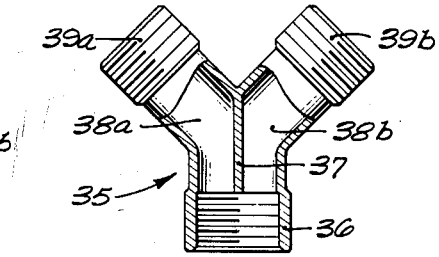
Figure 4:
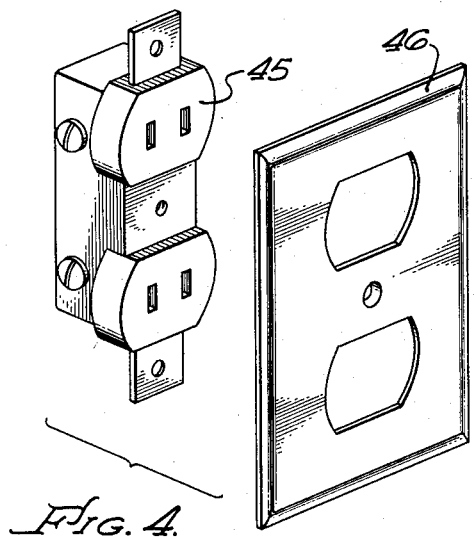
FIGURE 4 illustrates a conventional receptacle and cover plate which may be installed on the box of FIGURE 3.
Figure 5:
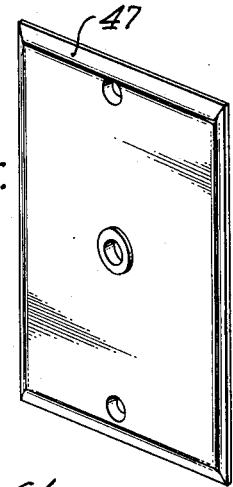
FIGURE 5 illustrates a telephone circuit cover plate for the box of FIGURE 3.
Figure 6:
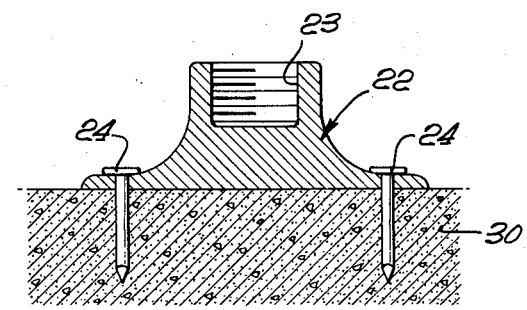
FIGURE 6 is a cross-sectional elevational view of the base member of FIGURE 1 showing its attachment to the floor of the building.
Figure 8:
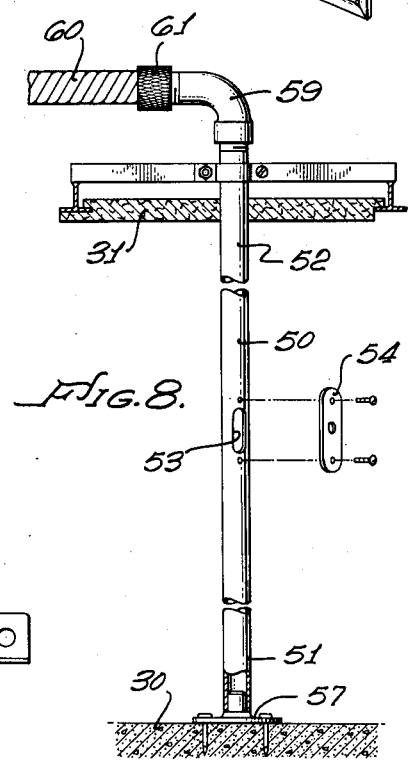
Figure 7A:
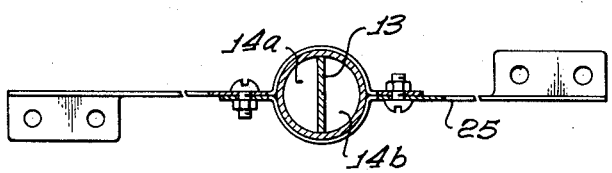

FIGURE 7(a) and 7(b) illustrate fittings used with the upper end of the conduit above the ceiling; and FIGURE 8 is an elevational view like FIGURE 1 illustrating an alternate form of my invention.

Referring now to FIGURE 1 of the drawings, the vertically disposed rigid electrical conduit 10 has its lower end 11 fastened to the upper end of electrical outlet box 15, while a shorter conduit section 20 is rigidly interconnected between a base member 22 and the lower end of box 15. Base member 22 is removably fastened to concrete floor 30 of the building, while upper end 12 of conduit 10 extends through an opening in the ceiling 31, in vertical alignment with base member 22.

Ceiling 31 is of the suspended type and is supported a short distance below concrete floor 33 of the next higher floor elevation within the building. A fastener 25 is fastened to the upper surface 31a of ceiling 31 and secures upper end 12 of conduit 10 against horizontal movement. A Y-shaped cable receptor 35 is coupled to the upper end of conduit 10 for receiving an electrical power cable and a telephone cable, both of which are carried within conduit 10 to the outlet box 15.

More specifically, conduit 10 is of the conventional rigid type having its ends 11 and 12 exteriorly threaded. A flat rigid member 13 is longitudinally inserted within the pipe, and preferably spot welded therein, to provide a separated pair of passageways 14a and 14b which extend the full length of the conduit.

Base member 22 is circular in form with a raised center portion and has a threaded opening 23 formed in the upper center thereof for threadedly receiving the lower end of conduit 20. Conventional masonry nails 24 inserted through holes provided around the periphery of the base member, are driven into concrete floor 30 for removably attaching the base member thereto.

Electrical outlet box 15 is of a conventional rectangular type, adapted to be vertically disposed with oppositely facing side openings 16a, 16b. A rigid divider member 17 is vertically disposed in the center of the box to separate the interior thereof into compartments 27a, 27b associated with the corresponding side openings. A fitting 18 provided on the upper end of the box has a threaded opening for receiving the threaded end 11 of conduit 10. In coupling conduit 10 to outlet box 15 the divider members 13 and 17 are aligned so that passageway 14a communicates with compartment 27a, and passageway 14b with compartment 27b, whereupon a set screw 28 provided in fitting 18 is tightened to secure the conduit in position. A fitting 19 provided on the lower end of the box is also provided with a threaded opening, which need not communicate with the interior of the box, however.

The short section 20 of rigid conduit is exteriorly threaded at both ends and is coupled between threaded opening 23 of base member 22 and threaded opening 19 of box 15.

The Y-shaped adapter 35 is interiorly threaded on its lower end 36, and exteriorly threaded on its two upper ends at 39a, 39b. As shown in FIGURE 7(b), a vertical divider element 37 within the adapter separates interior channels 38a, 38b. When the connection is made, adapter 35 is suitably aligned with conduit 10, and then secured in place by a set screw or by spot welding, not shown.

A lighting or power circuit cable and a telephone cable (both not shown) are respectively carried in flexible metallic conduits 41a, 41b above ceiling 31. The ends of the flexible metallic conduits are removably coupled by corresponding couplings 40a, 40b, to the outer ends 39a, 39b of Y-shaped adapter 35. Thus the lower end of the electrical lighting or power circuit cable extends to compartment 27a in outlet box 15, while the lower end of the telephone cable extends to compartment 27b in outlet box 15.

A conventional double receptacle 45 and cover plate 46 are utilized in conjunction with opening 16a on the outlet box 15 for connection of the lighting or power circuit cable. Utilization devices requiring power may therefore be connected to the receptacle 45. A cover plate 47 having a single central opening therein may be attached over opening 16b, or if desired a conventional telephone connection block may itself be used as the cover plate for opening 16b.

Having in the foregoing description described the preferred form of the invention illustrated in FIGURES 1 to 7(b) inclusive of the drawings, attention will now be turned to the alternate form of the invention illustrated in FIGURE 8 of the drawings.

In FIGURE 8 a section of rigid conduit 50 has its lower end 51 fastened to a base member 57 while its upper end 52 extends through an opening in the ceiling 31. Base member 57 is removably fastened to floor 30 by any suitable method. While the ends of conduit 50 are illustrated as being smooth, with pressure fittings, it will be nevertheless understood that threaded fittings may be used. A substantially circular opening 53 is provided in the wall of conduit 50 in the lower portion thereof, which provides the electrical circuit outlet. Cover plate 54 (shown in detached position) is used to cover outlet opening 53. An adapter 59 is connected to the upper end 52 of conduit 50, and a flexible metallic conduit 60 is coupled by means of a coupler 61 to the upper end of adapter 59. A single electrical cable (not shown) carried within flexible conduit 61 extends through adapter 59 and conduit 50 down to the outlet opening 53. Appropriate outlet connections, not shown, may be utilized, depending upon whether the cable supplies electrical power or whether it is a telephone cable.

In connection with FIGURE 8 it will be readily understood that conduit 50 is of relatively large diameter, for example, 3 or 4 inches, so as to permit opening 53 therein to be successfully utilized as an outlet box for the electrical cable. By the use of an appropriate divider element within conduit 50, together with a separated adapter such as adapter 35 of FIGURE 1, the arrangement of FIGURE 8 may be used to accommodate both a telephone cable and a power cable simultaneously if desired.

Various forms and modifications of the apparatus specifically shown and described herein are contemplated by the present invention. For example, while in FIGURE 1 the outlet box 15 is shown as being vertically positioned immediately below the tops of adjacent office desks 70 and 71, it will nevertheless be understood that the outlet box may be at a substantially higher or a substantially lower elevation. While a flat divider strip has been illustrated as the means for dividing the conduit into two separate passageways it will nevertheless be understood that, if desired, a smaller cylindrical conduit may be inserted within the larger one and eccentrically positioned therein so as to provide a pair of separated longitudinal passageways.

Although conduit 10 as illustrated and described herein is of the conventional rigid type, it will be understood that conventional thin wall conduit (which is, in fact, rigid) may be used if desired. Also, the conduit need not necessarily be made of metal, but may be of plastic material, for example.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. A movable electrical installation for the interior of a building comprising, in combination: a rectangular electrical outlet box having a pair of oppositely disposed side openings, a rigid member transversely disposed therein to divide the interior of said box into a pair of compartments respectively associated with said side openings, a threaded opening at the upper end of said box communicating with both of said compartments, and means for attaching a support member to the lower end of said box; a base member removably fastened to the floor of the building; a rigid support member vertically disposed with its lower end rigidly fastened to said base member and its upper end rigidly fastened to said box for supporting said box in vertical alignment with said base member; an elongated rigid electrical conduit vertically disposed in an elevated position within the building with the exteriorly threaded lower end thereof threadedly engaging said upper opening of said box and the exteriorly threaded upper end thereof extending through an opening in the ceiling in vertical alignment with said base member, and having a rigid divider member extending throughout the entire length thereof for dividing the interior of said conduit into two passageways which communicate with the respective compartments of said box; fastening means removably fastened to the upwardly facing ceiling surface for inhibiting horizontal movement of the upper end of said conduit; and a Y-shaped cable receptor threadedly engaging the upper end of said electrical conduit for receiving a pair of electrical cables, one to be inserted through each of said passageways into the corresponding compartment of said outlet box.

2. The combination claimed in claim 1 which further includes a separate flexible metallic electrical conduit removably coupled to each of the upwardly disposed ends of said Y-shaped cable receptor.

References Cited in the file of this patent

UNITED STATES PATENTS

| | | |
|---|---|---|
| 298,327 | Weston | May 6, 1884 |
| 438,592 | Eckert et al. | Oct. 14, 1890 |
| 786,911 | Miles et al. | Apr. 11, 1905 |
| 1,642,142 | Cook | Sept. 13, 1927 |
| 2,073,490 | Lewin | Mar. 9, 1937 |
| 2,892,172 | McGann | June 23, 1959 |

FOREIGN PATENTS

| | | |
|---|---|---|
| 155,417 | Australia | Feb. 25, 1954 |
| 21,569 | Switzerland | Apr. 28, 1900 |
| 1,080,317 | France | Dec. 8, 1954 |

OTHER REFERENCES

Book: "Conduit Wiring," by Croft, 1st ed., 1924, McGraw Hill Book Co., pp. 208, 403–405.